United States Patent [19]

Ishigami et al.

[11] 4,398,280
[45] Aug. 9, 1983

[54] INFORMATION RECORDING DISK PLAYER

[75] Inventors: Akira Ishigami, Toride; Yoshikatsu Imano, Yawahara, both of Japan

[73] Assignee: Victor Company of Japan Limited, Yokohama, Japan

[21] Appl. No.: 310,695

[22] Filed: Oct. 13, 1981

[30] Foreign Application Priority Data

Oct. 13, 1980 [JP] Japan .............................. 55-142754
Oct. 13, 1980 [JP] Japan .......................... 55-145485[U]

[51] Int. Cl.³ ........................ H02B 1/00; G11B 17/00
[52] U.S. Cl. ...................................... 369/75; 312/7.1; 312/242; 312/8; 369/77
[58] Field of Search ..................... 369/75, 77, 78, 79, 369/80; 312/7.1, 8, 242

[56] References Cited

U.S. PATENT DOCUMENTS 3,101,225 8/1963 Penningroth ........................ 312/7.1
4,270,820 6/1981 McMullan et al. ................. 312/242

Primary Examiner—Steven L. Stephan
Attorney, Agent, or Firm—Pollock, Vande Sande & Priddy

[57] ABSTRACT

The chassis of an information recording disk player, carrying various mechanisms is made of a noncontractive synthetic resin. The chassis comprises a flat body and peripheral walls integrally formed with the flat body so that the flat body is reinforced providing sufficient rigidity comparable to a conventional diecasting-made chassis. A casing which encloses the chassis comprises front, rear, top and bottom plates. The front and rear plates function as stands of an intermediate product for holding horizontally the chassis so that assembly and adjustment are readily performed. The casing is made of a conductive material to prevent spurious irradiation of electromagnetic waves from the pickup assembly of the player.

9 Claims, 4 Drawing Figures

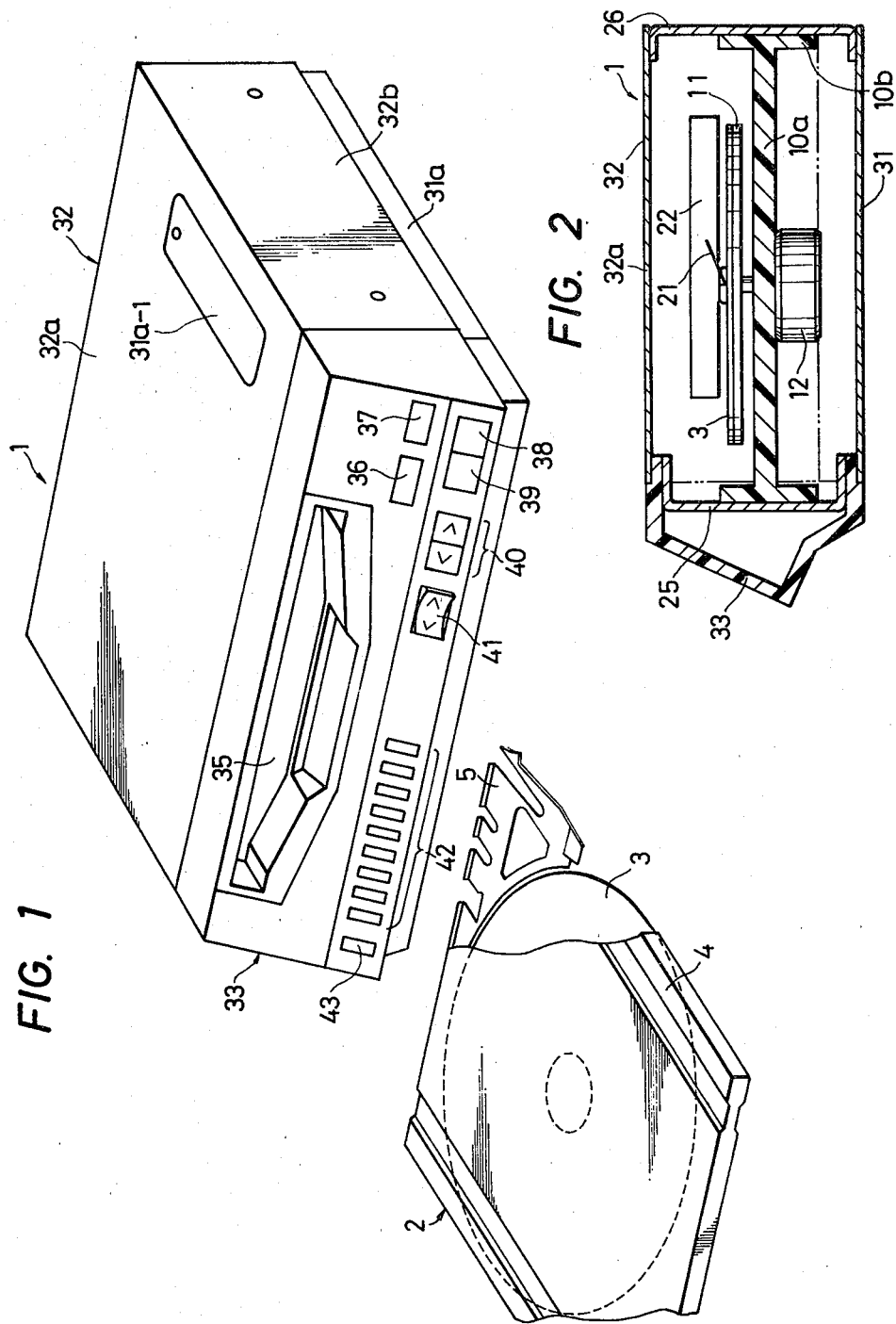

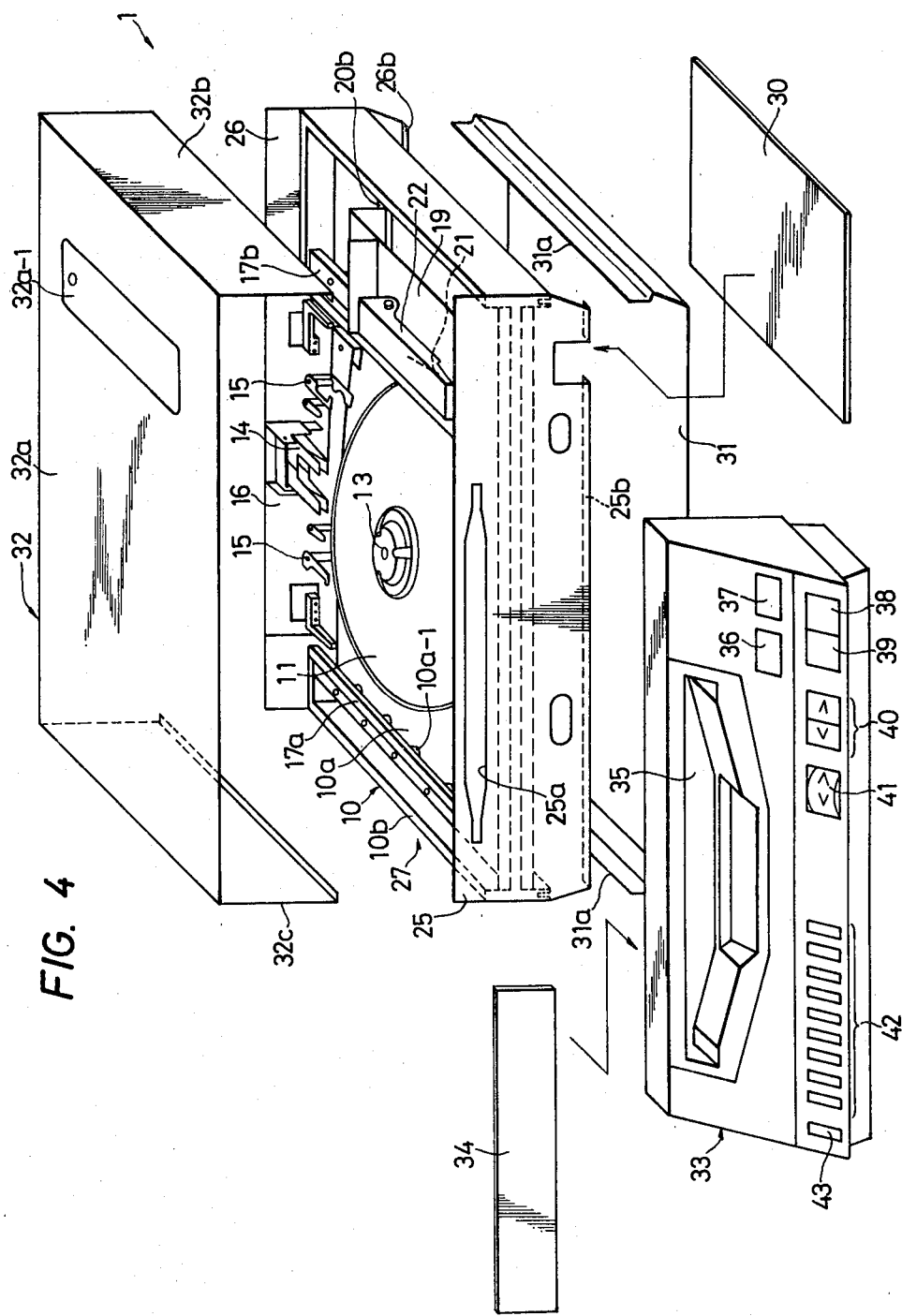

INFORMATION RECORDING DISK PLAYER

BACKGROUND OF THE INVENTION

This invention generally relates to information recording disk players, and more particularly, the present invention relates to the mechanical structure of a player for information recording disks, such as video disks.

Information recording disk players for reproducing video and/or audio signals from a disk are becoming popular. In such a disk player, a turntable is provided to rotate a disk at a given speed, and a pickup is arranged to trace the tracks on the disk. Since the turntable rotates at a very high speed, for instance 900 rpm, and the density of the tracks is extremely high compared to conventional phonograph records, it is necessary to accurately control various mechanisms. In order that the mechanisms of the player are accurately controlled, respective parts are accurately kept on a chassis with high precision. To this end conventional video disk players employ a chassis made of a diecasting. Although diecasting-made chassis are advantageous because of its rigidity, use of a such a chassis resulted in a heavy player. Furthermore, the conventional diecasting-made chassis are expensive, and it took a relatively long period of time for forming such a conventional diecasting-made chassis. If it is possible to make a chassis by using a synthetic resin, a chassis which is light in weight and low in cost can be obtained. However, most synthetic resins are apt to shrink or contract when being hardened, and therefore, sufficient accuracy in size and relative positional relationship between various parts mounted on the chassis cannot be obtained. Furthermore, since synthetic resins are not rigid as a metal, such a chassis made of a synthetic resin is apt to be curved or bent when various parts are mounted. For these reasons, synthetic resins have not been used as a material for a chassis of a video disk player or the like.

In addition to the above-described problem of the heavy chassis, conventional video disk players have suffered from a problem of irradiation of spurious electromagnetic waves which may cause a television set to be undesirably affected inasmuch as the casing of the player was made of a synthetic resin. Therefore, the conventional video disk players had to be placed, in use, apart from a television set.

Furthermore, conventional disk players had another disadvantage that an intermediate product of the player having only mechanical systems had to be assembled with electrical circuits with the aid of a stand which is temporarily attached to the chassis to hold the same horizontally so that various mechanisms already attached to the chassis are not damaged. In the same way, adjustment of various mechanisms and circuits had to be performed with the aid of the stand.

SUMMARY OF THE INVENTION

The present invention has been developed to remove the above-mentioned disadvantages and drawbacks inherent to already known video disk players.

It is, therefore, an object of the present invention to provide a video disk player which can be manufactured with high productivity.

Another object of the present invention is to provide an information recording the disk player having a synthetic resin-made chassis which has a particular shape to provide sufficient rigidity.

A further object of the present invention is to provide an information recording disk player having a chassis made of a noncontractive synthetic resin so that various parts are accurately mounted on the chassis.

A still further object of the present invention is to provide an information recording disk player which can be readily manufactured without the aid of a temporary stand.

A still further object of the present invention is to provide an information recording disk player having a casing made of a conductive material so that irradiation of spurious electromagnetic waves is prevented.

In accordance with the present invention there is provided an information recording disk player, comprising: (a) a chassis made of a noncontractive synthetic resin, said chassis having a flat body and peripheral wall portions integrally formed with said flat body around the circumference of said flat body, said peripheral wall portions extend along a plane which is normal to the plane of said flat body; (b) first means attached to said chassis for loading and unloading an information recording disk in and from said disk player; (c) second means attached to said chassis for rotating a loaded disk to be played back; (c) third means attached to said chassis for picking up information from said disk; (d) fourth means for processing the output signal from said third means; (e) a casing having a front plate, a rear plate, a top plate and a bottom plate all attached to said chassis, each of said front and rear plates having inwardly bent edges at its upper and lower portions so that said front and rear plates function as stands which hold said chassis horizontally when manufacturing said disk player, said bottom plate covering the lower portion of said chassis and said top plate covering the upper and side portions of said chassis so that all the mechanisms of said player are entirely enclosed by said casing; and (f) a front panel attached to said front plate for holding manipulation knobs and displays.

BRIEF DESCRIPTION OF THE DRAWINGS

These and other objects and features of the present invention will become more readily apparent from the following detailed description of the preferred embodiment taken in conjunction with the accompanying drawings in which:

FIG. 1 is a schematic perspective view of an embodiment of the video disk player according to the present invention;

FIG. 2 is a cross-sectional side view of the video disk player of FIG. 1;

FIG. 4 is an exploded perspective view of a finished product of the video disk player of FIG. 1.

The same or corresponding elements and parts are designated at like numerals throughout the drawings.

DETAILED DESCRIPTION OF THE INVENTION

Figure 3:
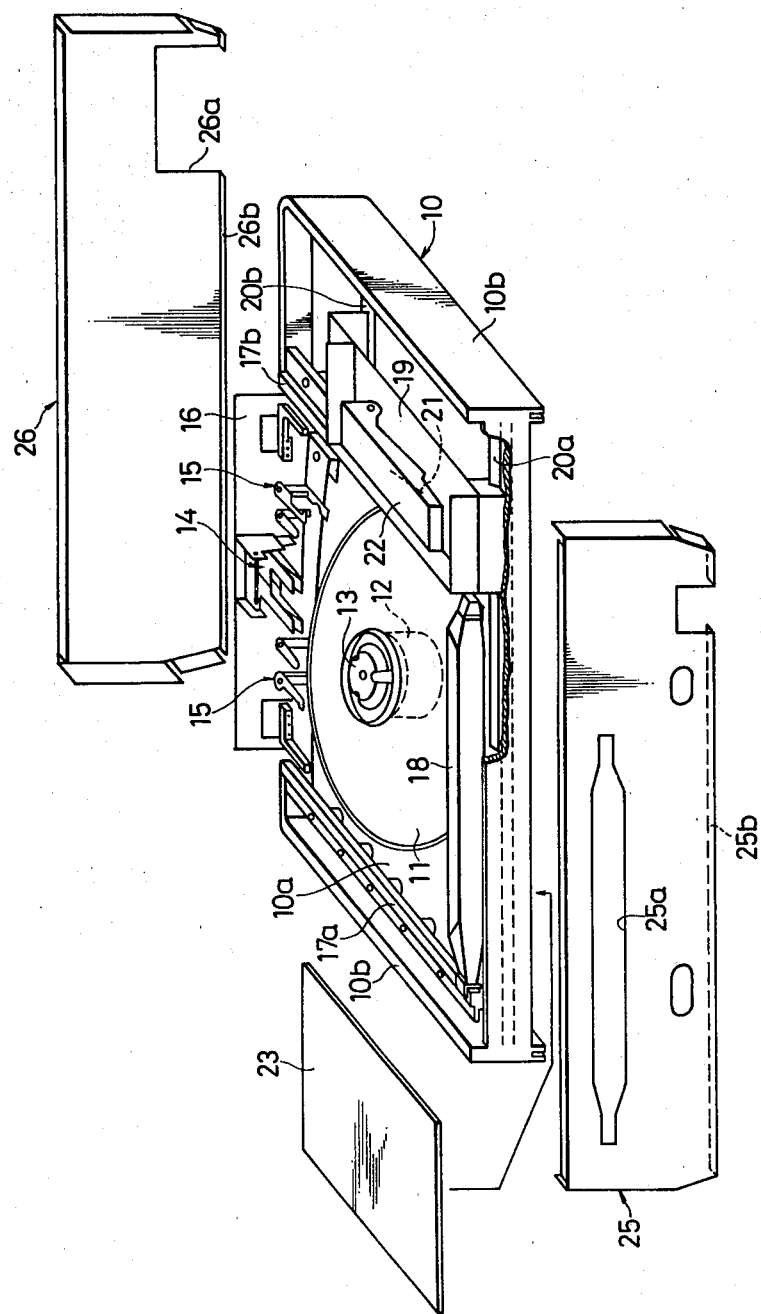
FIG. 3 is an exploded perspective view of an intermediate product of the video disk player of FIG. 1.

Referring to FIG. 1, an embodiment of the present invention is shown by way of a perspective view. The video disk player is generally designated at a reference numeral 1, and a disk case including a video disk 3 is designated at a reference 2. The disk 3 has spiral pattern tracks so that information is recorded in the form of geometrical deformation on the surface thereof. The disk case 2 comprises a case body 4 made of a synthetic resin and a lid 5 detachably connected to the case body 4 for closing the opening of the case body 4.

The video disk player 1 is of box-like shape, and its inner structure is shown in FIGS. 2 to 4. FIG. 3 is a perspective view showing an intermediate product of the video disk player in which all mechanical systems have been assembled, and FIG. 4 is a perspective view showing a finished product of the video disk player to which a signal processing system and exterior surface members are attached.

As shown in FIGS. 2 and 3, a chassis 10 for mounting various mechanisms is provided. The chassis 10 is made of a noncontractive synthetic resin, and is formed by either a molding technique or a thermo-compression technique. For instance, a resin mainly including polyester may be used. As such a synthetic resin, Bulk Molding Compound (trademark) produced by Showa Highpolymer Co. Ltd. or Duranex (trademark) produced by Polyplastics Co. Ltd. may be used. The chassis 10 comprises a flat body 10a and a peripheral wall portions 10b which are surrounding the flat body 10 along its entire periphery. The wall portions 10b extend in a direction substantially normal to the plane of the flat body 10a upwardly and downwardly from the flat body 10b. In FIG. 3, a portion of the wall portions 10b is shown to be cut for showing the inside structure of the video disk player 1. With the provision of the peripheral wall portions 10b the chassis 10 is prevented from being deformed. Namely, the peripheral wall portions 10b reinforces the flat body 10a, and thus the peripheral wall portions 10b are also referred to as ribs. Therefore, undesirable warp or curve does not occur in the plane of the flat body of the chassis 10. The chassis 10 made of a noncontractive resin and having the ribs 10b is comparable to a conventional diecasting-made chassis in connection with the rigidity and accuracy. In addition, since the chassis 10 can be made by an injection molding technique or thermo-compression technique, it is possible to produce low cost chassis with high productivity within a short period of time.

On the upper and lower surfaces of the flat body 10a of the chassis 10 are mounted various mechanisms for the reproduction of information from the disk 3. As shown in FIG. 2, a turntable drive motor 12 is attached to the lower surface of the flat body 10a so that the shaft of the motor 12 drives a turntable 11 positioned above the upper surface of the flat body 10a. The turntable 11 is fixed to the motor shaft by means of a disk-hole clamping member 13. A bracket 16 is fixedly attached to the upper surface of the flat body 10a. A disk clamping mechanism 14 for fixing the circumferential groove guard, i.e. an annular projection, of the disk 3, and a plurality of latching mechanisms 15 for latching the lid 5 of the disk case 2 are attached to the bracket 16. Left and right guide rails 17a and 17b are attached to the flat body 10a at both sides of the turntable 11. In detail, a plurality of columner projections 10a-1 are integrally formed with the flat body 10a, and the left and right guide rails 17a and 17b are respectively screwed to the columner projections 10a-1. The left and right guide rails 17a and 17b are parallel to each other so as to guide a case opening mechanism 18 which is slidably attached at its both ends to the left and right guide rails 17a and 17b. The case opening mechanism 18 is arranged to be engaged with one end of the disk case 2 so that the disk case 2 is moved to the inside of the player as the case opening mechanism 18 slides along the left and right guide rails 17a and 17b. The case opening mechanism 18 is arranged to open the opening side of the disk case 2 when the disk case 2 is fully received in the player 1.

A pickup assembly 22 having a reproduce stylus 21 is mounted on a carridge 19 which is slidably mounted on parallel guide rails 20a and 20b. The guide rails 20a and 20b are integrally formed with the flat body 10a on the upper surface thereof. With this arrangement, the carridge 19 is capable of moving leftward and rightward so that the reproduce stylus 19 traces the tracks on the rotating disk 3 on the turntable 11.

The above-described various elements or parts are assembled with the chassis 10, where the relative positional relationship between various mechanisms is accurately held, and therefore, various operations of disk loading and unloading and movement of the pickup assembly 22 etc are accurately performed with high precision in use.

On the lower surface of the chassis 10 is screwed a printed circuit board 23, as shown in FIG. 3, on which various electrical circuits for controlling the rotation of the motor 12 and the movement of the carridge 19 are attached. Another printed circuit board 30 having various electrical circuits for processing the picked up signal from the pickup assembly 22, is also screwed to the lower surface of the chassis 10 next to the above-mentioned printed circuit board 23.

A front plate 25 and a rear plate 26 are respectively attached by means of screws to the front and the back of the chassis 10. In the front plate 25 is made an opening 25a through which the disk case 2 is loaded and unloaded. The rear plate 26 has a U-shaped recess 26a for attachment of connectors for making electrical connections to other devices, such as a television set. Each of the front and rear plates 25 and 26 has a rectangular shape and has inwardly bent edges at its periphery so that both the front and rear plates 25 and 26 are difficult to be deformed. Each of the front and rear plates 25 and 26 is attached to the chassis 10 in such a manner that lower ends, which are inwardly bent, function as legs or stands so that an intermediate product of the player of FIG. 3 can be horizontally held on a working bench or the like. In order to work on the bottom of the chassis 10, the chassis 10 is turned upside down. In this case, the inwardly bent upper ends of the front and rear plates 25 and 26 function as legs or stands to horizontally hold the chassis 10. Since the intermediate product of FIG. 3 can be held horizontally with the aid of the front and rear plates 25 and 26, adjustment of various mechanisms on the chassis 10 can be readily performed.

After installation of the printed circuit board 23 and adjustment, various exterior surface members are attached to the intermediate product of FIG. 3 to complete the player. As shown in FIG. 4, an exterior surface bottom plate 31 having left and right walls, which rise from the body of the bottom plate 31, is attached to the chassis 10 in such a manner that edges 31a of the left and right walls are respectively received in grooves 10b-1 made in the lower ends of the left and right ribs 10b of the chassis 10. The bottom plate 31 is screwed to the chassis 10 so that the lower part of the chassis 10 is covered thereby. Nextly, an exterior surface top plate 32 having U-shape is screwed to the chassis 10 to cover the upper and side sections of the chassis 10. The top plate 32 comprises a flat body 32a and left and right side walls 32c and 32b which are bent from the flat body 32a to form U-shape. A lid 32a-1 is detachably attached to the flat body 32a of the top plate 32. This lid 32a-1 may be opened when changing the reproduce stylus 21 with another.

The above-mentioned front plate 25, the rear plate 26, the bottom plate 31 and the top plate 32 are all made of iron plates. As a result, the inside of the player is entirely enclosed by iron plates, which are of conductive material, at six surfaces of the front, rear, left side, right side, top and bottom of the box-like shape of the player 1. Since the disk player is hermetically shielded by a conductive material, spurious electromagnetic waves emitted from the pickup assembly 32 is effectively blocked so as to prevent undesirable irradiation. Thus, the disk player 1 can be located adjacent to other devices, such as a television set, because undesirable influence due to spurious irradiation does not occur. According to experiments the magnitude of spurious irradiation of electromagnetic waves from the disk player 1 of the present invention has been reduced by approximately 10 dB compared to conventional disk players having a casing made of a synthetic resin. Although the casing is made of iron plates in this embodiment, other conductive material, such as aluminum may also be used to obtain the same results.

A front manipulation panel 33 made of a synthetic resin is attached to the front surface of the front plate 25 with a printed circuit board 34 assembled on the back thereof, which printed circuit board 35 has various circuits for the manipulation or control system. In the front manipulation panel 33 is made an opening 35 through which the disk case 2 may be loaded and unloaded. Various manipulation keys or knobs 38 through 43, such as a power switch knob, auto search knob, manual search knot etc, as well as various display devices 36 and 37, such as a mode display, are attached to the front manipulation panel 33.

A finished product of the player 1 is obtained when all the parts of FIG. 4 are assembled, and the completed player operates as follows. As shown in FIG. 1, the user or operator feeds the disk case 2 into the opening 35 of the front panel 33 and pushes the same into the inside the player so that the opening side of the disk case 2 engages with the disk opening mechanism 18 of FIG. 3. The disk case 2 is further pushed so that it is entirely received in the player 1. The disk 3 in the disk case 2 is temporarily clamped by the disk clamping mechanism 14 to be horizontally held. The disk case 2 is drawn out of the player 1 with the disk 3 held in the player 1 above the turntable 11. The disk 3 is lowered to be placed on the turntable 11, and then the carridge 19 slides leftward so that the reproduce stylus 21 of the pickup assembly 22 traces the information recorded grooves of the rotating disk 3. The signal from the pickup assembly 22 is processed in various electrical circuits, and an output signal will be obtained so that reproduced video and/or audio information, can be obtained from a television set (not shown) connected by a cable to the disk player 1. When restoring the disk 3 into the disk case 2, an empty disk case 2 is inserted in the player to catch the disk 3.

From the foregoing, it will be understood that the disk player according to the present invention can be readily manufactured with high productivity and at a low cost, while relative positional relationship between various parts or mechanisms on the chassis is accurately held. Especially, since the front and rear plates 25 and 26 are attached to the chassis 10 to horizontally hold the chassis, the assembly line may be divided into two or more, i.e. mechanical assembly line and manipulation system and signal system assembly line, so that disk players can be manufactured efficiently. The use of a synthetic resin as a material of the chassis contributes to provide a light disk player. Namely, the disk player according to the present invention is lighter in weight than conventional players even though the casing of the disk player according to the present invention is made of a metal. Furthermore, spurious irraidiation of electromagnetic waves is effectively prevented by the iron plate-made casing so that the disk player can be located close to other devices in use.

Although the embodiment of the present invention has been described in connection with a video disk player, the invention may be applicable to other disk players which reproduces only audio signals. The above-described embodiment is just an example of the present invention, and therefore, it will be apparent for those skilled in the art that many modifications and variations may be made without departing from the spirit of the present invention.

What is claimed is:

1. An information recording disk player, comprising:
   (a) a chassis made of a noncontractive synthetic resin, said chassis having a flat body and peripheral wall portions integrally formed with said flat body around the circumference of said flat body, said peripheral wall portions extend along a plane which is normal to the plane of said flat body;
   (b) first means attached to said chassis for loading and unloading an information recording disk in and from said disk player;
   (c) second means attached to said chassis for rotating a loaded disk to be played back;
   (c) third means attached to said chassis for picking up information from said disk;
   (d) fourth means for processing the output signal from said third means;
   (e) a casing having a front plate, a rear plate, a top plate and a bottom plate all attached to said chassis, each of said front and rear plates having inwardly bent edges at its upper and lower portions so that said front and rear plates function as stands which hold said chassis horizontally when manufacturing said disk player, said bottom plate covering the lower portion of said chassis and said top plate covering the upper and side portions of said chassis so that all the mechanisms of said player are entirely enclosed by said casing; and
   (f) a front panel attached to said front plate for holding manipulation knobs and displays.

2. An information recording disk player as claimed in claim 1, wherein said noncontractive synthetic resin mainly comprises polyester.

3. An information recording disk player as claimed in claim 1, wherein said casing is made of a conductive material.

4. An information recording disk player as claimed in claim 3, wherein said casing is made of iron plates.

5. An information recording disk player as claimed in claim 1, wherein said front plate and said rear plates are attached to said chassis so that said front and rear plates function as stands of an intermediate product to horizontally hold said chassis.

6. An information recording disk player as claimed in claim 1, wherein said front plate has an opening through which said disk can be loaded and unloaded.

7. An information recording disk player as claimed in claim 1, wherein said rear plate has a U-shaped recess for attaching connectors.

8. An information recording disk player as claimed in claim 1, wherein said top plate has a detachably attached lid which may be opened when a stylus included in said third means is changed with another.

9. An information recording disk player as claimed in claim 1, wherein said front panel is made of a synthetic resin and has an opening through which said disk can be loaded and unloaded.

* * * * *